US011521574B2

(12) United States Patent
Bonnet et al.

(10) Patent No.: US 11,521,574 B2
(45) Date of Patent: Dec. 6, 2022

(54) DYNAMICALLY GAMUT ADJUSTABLE DISPLAYS

(71) Applicant: HEWLETT-PACKARD DEVELOPMENT COMPANY, L.P., Houston, TX (US)

(72) Inventors: Alois Bonnet, Houston, TX (US); Greg Staten, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1050 days.

(21) Appl. No.: 16/077,361

(22) PCT Filed: Apr. 10, 2017

(86) PCT No.: PCT/US2017/026762
§ 371 (c)(1),
(2) Date: Aug. 10, 2018

(87) PCT Pub. No.: WO2018/190786
PCT Pub. Date: Oct. 18, 2018

(65) Prior Publication Data
US 2021/0210048 A1 Jul. 8, 2021

(51) Int. Cl.
*G09G 5/00* (2006.01)
*G09G 5/02* (2006.01)
*H04N 1/60* (2006.01)
*G06F 3/048* (2013.01)
(Continued)

(52) U.S. Cl.
CPC .............. *G09G 5/02* (2013.01); *G09G 5/003* (2013.01); *G06F 3/048* (2013.01); *G09G 2320/0666* (2013.01); *G09G 2340/06* (2013.01)

(58) Field of Classification Search
CPC combination set(s) only.
See application file for complete search history.

(56) References Cited

U.S. PATENT DOCUMENTS 6,956,580 B2 * 10/2005 Rozzi ..................... G09G 5/02
345/589
7,646,391 B1 1/2010 Hayward
(Continued)

FOREIGN PATENT DOCUMENTS

CN 101772961 7/2010
CN 101924858 12/2010
(Continued)

OTHER PUBLICATIONS

Ha, "JVC Now Shipping $2400 42-inch LCD "Monitor" for DSLR Users", TechCrunch, Retrieved from Internet—https://techcrunch.com/2009/05/26/jvc-now-shipping-2400-42-inch-lcd-hdtv-for-dslr-users/, May 26, 2009, 6 Pages.

*Primary Examiner* — Wesner Sajous
(74) *Attorney, Agent, or Firm* — HP Inc. Patent Department

(57) ABSTRACT

A computing device may include a processor and a display device communicatively coupled to the processor wherein the display device includes a wide gamut mode wherein the wide gamut mode comprises a plurality of different gamut profiles and wherein the display device adjusts from a first gamut profile to a second gamut profile based on a gamut profile associated with an image to be represented on the display device.

18 Claims, 3 Drawing Sheets

(51) Int. Cl.
*H04N 9/64* (2006.01)
*H04N 9/73* (2006.01)

(56) References Cited

U.S. PATENT DOCUMENTS

| | | | | |
|---|---|---|---|---|
| 8,243,326 | B2* | 8/2012 | Olson | H04N 1/6011 358/1.9 |
| 10,083,234 | B2* | 9/2018 | Maharajh | H04L 65/80 |
| 2005/0146734 | A1 | 7/2005 | Stokes et al. | |
| 2008/0062193 | A1* | 3/2008 | Olson | H04N 1/46 345/591 |
| 2008/0062442 | A1* | 3/2008 | Olson | H04N 1/6011 358/1.9 |
| 2008/0062443 | A1* | 3/2008 | Olson | H04N 1/6011 358/1.9 |
| 2008/0079745 | A1* | 4/2008 | Choi | H04N 1/6052 345/589 |
| 2008/0204829 | A1* | 8/2008 | Harrington | H04N 1/6094 358/504 |
| 2008/0246981 | A1* | 10/2008 | Ido | H04N 1/6058 358/1.9 |
| 2010/0277492 | A1 | 11/2010 | Frederick | |
| 2010/0302271 | A1* | 12/2010 | Sloan | G09G 5/04 345/590 |
| 2011/0157212 | A1 | 6/2011 | Zhang et al. | |
| 2011/0176153 | A1 | 7/2011 | Hoshino | |
| 2012/0013923 | A1 | 1/2012 | Sakurai | |
| 2013/0207996 | A1* | 8/2013 | Shibuya | G09G 5/003 345/604 |
| 2014/0071102 | A1 | 3/2014 | Pieper et al. | |
| 2014/0136492 | A1 | 5/2014 | Lerios | |
| 2014/0140616 | A1 | 5/2014 | Choi et al. | |
| 2014/0267454 | A1 | 9/2014 | Ikenishi | |
| 2018/0365250 | A1* | 12/2018 | Maharajh | G06Q 30/0269 |
| 2019/0138553 | A1* | 5/2019 | Maharajh | G06Q 30/0244 |
| 2020/0132992 | A1* | 4/2020 | Ouderkirk | G02B 27/017 |

FOREIGN PATENT DOCUMENTS

| | | | |
|---|---|---|---|
| CN | 105261326 | | 1/2016 |
| EP | 1909485 | | 9/2008 |
| EP | 2175660 | | 4/2010 |
| JP | 2002149149 | A | 5/2002 |
| KR | 20140066771 | A * | 6/2014 ............... G06K 9/40 |

* cited by examiner

DYNAMICALLY GAMUT ADJUSTABLE DISPLAYS

BACKGROUND

In connection with a display device, a gamut of that display device describes a subset of colors which can be represented within a given color space or by a certain output device. These display devices may include a number of presets describing different gamut profiles each with a defined color space.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
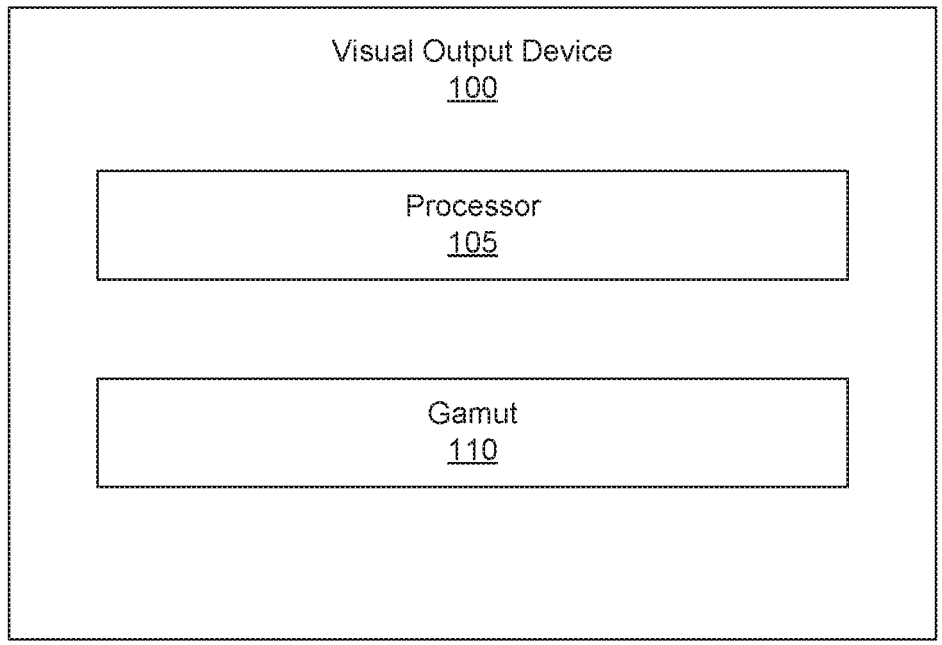
FIG. 1 is a block diagram of a visual output device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Display devices are also called emissive devices because they emit light. The color of light any given display device can emit is called its gamut. Exactly which colors are included in any given gamut is based on the physical capabilities of the light emitting devices in the display device. For example, the light emitted from a display device that includes light-emitting diodes (LEDs) is based on the wavelength of light that is emitted from the LEDs and color filters that are applied to the emitted light. Other devices are similarly limited to the color space defined within their gamuts, but the gamut may vary from display device to display device.

During operation of the display device, the display device is provided with image data from a source such as a computing device or other image source. In the present specification and in the appended claims, the term "image" is meant to be understood as a visible picture, whether a single image or a number of images presented as a video, to be presented on a display device. This image data includes data describing its color space or gamut and may usually be defined with a specific gamut profile such as sRGB, ITU-R BT.709, Adobe RGB developed by Adobe Systems, Inc., DCI-P3, ITU-R BT.2020, among other gamut profiles defined or published by the International Telecommunication Union (ITU) or other organization. Indeed, because these gamut profiles do not encompass all colors present in the entire human visual spectrum, additional gamut profiles may be developed to which the present description would apply. In an example, the display device includes at least two or a plurality of gamut profiles. In an example, the display device is a wide gamut mode display device capable of displaying an image in the gamut profiles described herein or in alternative or arbitrary gamut profiles. Thus, in an example, the display device may be capable of supporting a gamut larger than, for example, sRGB such that it is capable of display sRGB as well as any of ITU-R BT.709, Adobe RGB developed by Adobe Systems, Inc., DCI-P3, ITU-R BT.2020 gamut profiles or larger gamut profiles.

The present specification describes a computing device that includes a processor and a display device communicatively coupled to the processor wherein the display device includes a wide gamut mode wherein the wide gamut mode comprises a plurality of different gamut profiles and wherein the display device adjusts from a first gamut profile to a second gamut profile based on a gamut profile associated with an image to be represented on the display device. In an example, the gamut profile associated with the image is provided to the display device; interpreted by the display device, and used by the display device to dynamically adjust from the first gamut profile to the second gamut profile matching the gamut profile of the image.

The present specification further describes a computing device that includes a processor and a display device communicatively coupled to the processor wherein the display device includes a wide gamut mode wherein the wide gamut mode includes a plurality of different gamut profiles and wherein the display device adjusts from a first gamut profile to a second gamut profile based on a gamut profile associated with an image to be represented on the display device.

The present specification further describes a computer program product for adjusting the gamut profile on a display device the computer program product including a computer readable storage medium including computer usable program code embodied therewith; the computer usable program code to, when executed by a processor receive; over a display data channel, an indication of a first gamut profile associated with an image to be presented on the display device, and at the display device, switch from a second gamut profile to the first gamut profile.

As used in the present specification and in the appended claims, the term "a number of" or similar language is meant to be understood broadly as any positive number comprising 1 to infinity; zero not being a number; but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a visual output device (100) according to an example of the principles described herein. The visual output device (100) may be any type of emissive device. Examples of visual output devices (100) may include a cathode ray tube (CRT), a thin-film transistor liquid crystal display (TFT-LCD), a liquid crystal display (LCD), a flat panel light emitting diode (LED) display, organic light-emitting diode (OLED) display, an image projection device, a laser projection device, among others.

The visual output device (100) of the present specification is a wide gamut output device. As used in the present specification and in the appended claims, a "wide gamut" output or display device or an output or display device that includes a "wide gamut mode" is meant to be understood as having a gamut encompassing, at least, two individual color spaces. Examples of color spaces include sRGB, ITU-R BT.709, Adobe RGB developed by Adobe Systems, Inc., DCI-P3, ITU-R BT.2020. Additionally, the present specification contemplates that the above industry-defined gamut profiles are not an exhaustive list of gamut profiles possible and instead contemplates any other gamut profile possible. For example, arbitrary gamut profiles may be present that include some of the color space in certain industry-defined gamut profiles but not all. Additionally, the arbitrary gamut profile may encompass all color spaces and include additional color space not previously anticipated by the above industry-defined gamut profiles. In an example, the wide gamut output device may be capable of presenting a color space that includes a color space less than a totality of colors of at least two color gamut profiles but encompassing at least portions of those at least two gamut profiles. Even further, the wide gamut display device or output device may be capable of representing all human discernable colors thus including every possible gamut profile or gamut profile permutation. For ease of understanding, the above-mentioned industry-defined gamut profiles will be used to describe the operation and characteristics of the visual output device (100).

The visual output device (100) may be implemented along with, for example an image source. Examples of image sources include servers, desktop computers, laptop computers, personal digital assistants (PDAs), mobile devices, smartphones, gaming systems, and tablets, satellite feeds, cable feeds, among other image sources. The visual output device (100) may be utilized in any data processing scenario including, stand-alone hardware, mobile applications, through a computing network, or combinations thereof. Further, the visual output device (100) may be used in a computing network, a public cloud network, a private cloud network, a hybrid cloud network, other forms of networks, or combinations thereof.

To achieve its desired functionality, the visual output device (100) may include various hardware components. Among these hardware components may be a number of processors (105), a number of data storage devices, a number of peripheral device adapters, and a number of network adapters. These hardware components may be interconnected through the use of a number of busses and/or network connections. In one example, the processor (105), data storage device, peripheral device adapters, and a network adapter may be communicatively coupled via a bus.

The processor (105) may include the hardware architecture to retrieve executable code from the data storage device or from a device communicatively coupled to the visual output device (100) and execute the executable code. The executable code may, when executed by the processor (105), cause the processor (105) to implement at least the functionality of receiving an indication of, among a plurality of gamut profiles, a specific gamut profile of an image to be presented on the visual output device (100) from a computing device and/or dynamically adjusting the gamut profile of the visual output device (100) to match the gamut profile of the image according to the methods of the present specification described herein. In the course of executing code, the processor (105) may receive input from and provide output to a number of the remaining hardware units.

The data storage device may store data such as executable program code that is executed by the processor (105) or other processing device. As will be discussed, the data storage device may specifically store computer code representing a number of applications that the processor (105) executes to implement at least the functionality described herein. The data storage device may include various types of memory modules, including volatile and nonvolatile memory. Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus; or device; or any suitable combination of the foregoing. In another example, a computer readable storage medium may be any non-transitory medium that can contain, or store a program for use by or in connection with an instruction execution system, apparatus, or device.

The hardware adapters in the visual output device (100) enable the processor (105) to interface with various other hardware elements, external and internal to the visual output device (100). For example, the peripheral device adapters may provide an interface to input/output devices, such as, for example, a mouse, or a keyboard. The peripheral device adapters may also provide access and communication to other external devices such as a computing device, an external storage device, a number of network devices such as, for example, servers, switches, and routers, client devices, other types of computing devices, and combinations thereof.

The visual output device (100) may; along with execution of the processor (101), display both images and a number of graphical user interfaces (GUIs) on the visual output device (100). The GUIs may be associated with executable program code representing the number of applications stored on the data storage device associated with a computing device communicatively coupled to the visual output device (100). The GUIs may display, for example, user interfaces associated with any number of applications being executed a computing device.

During the operation of the visual output device (100), the visual output device (100) receives an indication of, among a plurality of gamut profiles, a specific gamut profile of an image to be presented on the visual output device (100) from, for example, a computing device. The indication may be in the form of a signal presented to the visual output device (100) via, for example, a display data channel. The signal may include data provided to the processor (105) of the visual output device (100) via, for example, an application program interface (API) conduit, that indicates the gamut profile associated with the image. In an example, certain protocols that enable digital communication between the visual output device (100) and a graphics adapter of, for example, a computing device may be implemented. In this example, the visual output device (100) may communicate its supported gamut profiles to the image source (e.g., computing device) while the image source also provides, over the same connection, gamut profile data describing the gamut profile associated with an image to be displayed on the visual output device (100). Examples of API conduits may include and/or implement physical lines such as DDC1, DDC2B and DDC2Ab physical links as well as DDC/CI commander interface specifications which specifies the way in which an image source sends and receives date to and from a visual output device (100) and enhanced display data channel (E-DDC) which also specifies the way in which an image source sends and receives date to and from a visual output device (100). In an example, the processor (105) executes these APIs such that the data may be received as well as sent to the visual output device (100).

In an example where the visual output device (100) does not support the gamut profile associated with the image, the visual output device (100) may provide an indication detailing that the visual output device (100) cannot display the image in the gamut profile associated with the image. In this example, an error message may be provided to the user via the visual output device (100). In an example, an error message may be provided to the image source such as a computing device indicating that the visual output device (100) does not support the gamut profile associated with the image. In this example, the computing device may impose a gamut conversion process in order to convert the color space of the image from that of the gamut profile associated with the image to that of a gamut profile that the visual output device (100) supports.

Because the visual output device (100) of the present application is a wide gamut visual output device (100), however, the indication of the gamut profile associated with the image or application may be communicated to the visual output device (100) via the display data channel as described herein. In this example, the processor (105) receives the indication of what gamut profile is associated with the image to be presented to the user on the visual output device (100). The processor (105) then determines the current gamut profile being displayed on the visual output device (100) and, where the current gamut profile is different from that of the gamut profile associated with the image, the processor (105) adjusts the gamut profile presented on the visual output device (100) to match that of the image. In an example, the processor (105) may include a color management engine that, when executed by the processor (105) may change the gamut profile currently being displayed on the visual output device (100) to another determined gamut profile. To implement this functionality, the color management engine may adjust input values received by the monitor based upon a native color gamut of the visual output device which can be determined upon the manufacture of the visual output device (100) and by taking into account response characteristics of the properties of the hardware properties of the visual output device such as an RGB LED backlight in response to various inputs. Because the visual output device (100) is capable of displaying a relatively broader range of colors relative to the color gamut of various other output devices, the input values received by the visual output device (100) can be adjusted by the color management engine to emulate the gamma profile as well as other properties (e. g., RGB primaries, white point, luminance). Additionally, in some examples, the light emanated by, for example, an RGB LED backlight can be varied in order to modify the white point and/or luminance of the visual output device (100) in order to match a particular gamut profile. This emulation process is described in U.S. Pat. No. 8,390,642 entitled "System and Method for Color Space Setting Adjustment" which is hereby incorporated by reference herein in its entirety.

This provides a user with an accurate visual presentation of the image according to the image's gamut profile as presented to the visual output device (100). This also avoids the situation where the image source, such as the computing device, engages in a gamut conversion process in order to fit the gamut of the visual output device (100). Instead, the wide-gamut visual output device (100) may be capable of supporting the gamut profile associated with the image and may change the current gamut settings on the visual output device (100) to fit that gamut profile.

Figure 2:
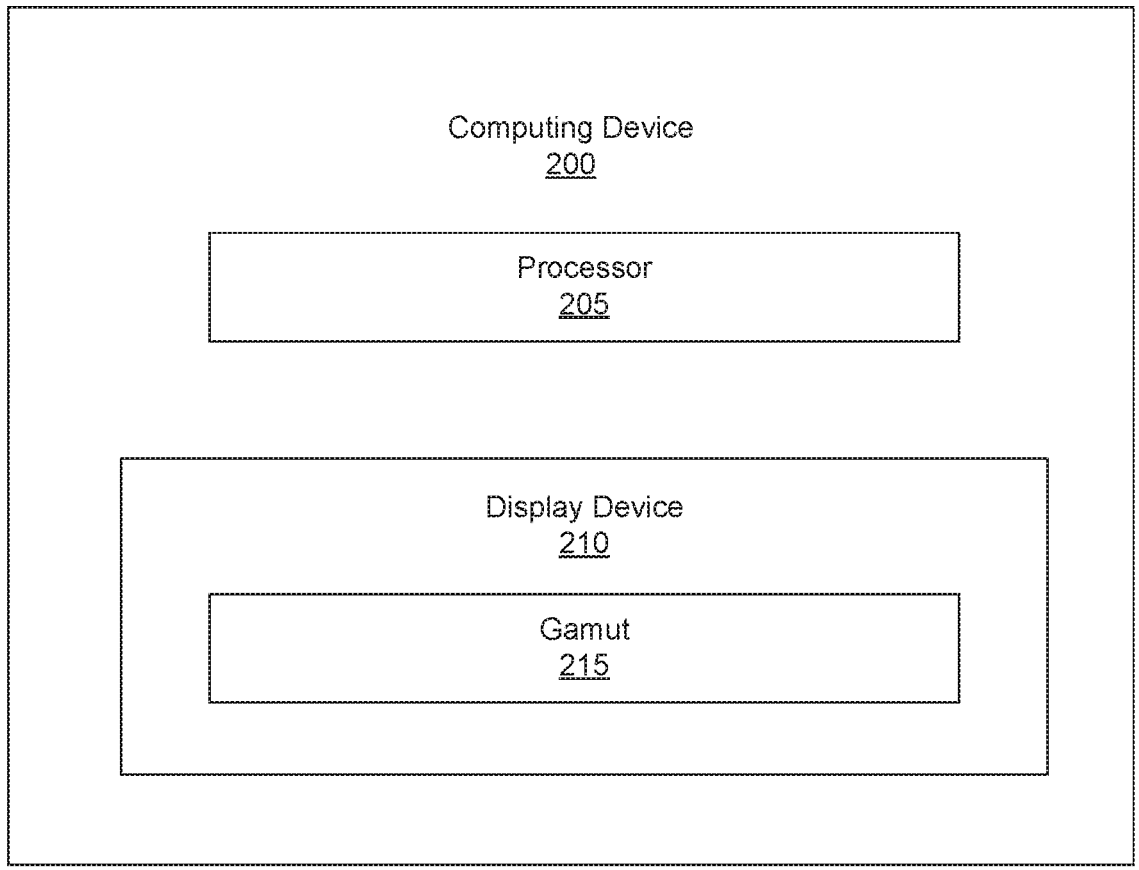
FIG. 2 is a block diagram of a computing device according to an example of the principles described herein.

FIG. 2 is a block diagram of a computing device (200) according to an example of the principles described herein. The computing device (200) may be a server, a desktop computer, a laptop computer, a personal digital assistants (PDAs), a mobile device, a smartphone, a gaming system, and a tablet, among other types of computing devices.

The computing device (200) may include a processor (205) and be communicatively coupled to a display device (210) similar to the visual output device (FIG. 1, 100) of FIG. 1). The processor (205) may receive an indication of a gamut profile associated with an image to be presented on the display device (210). This indication may come in the form of a tag associated with data describing the image. This tag may include, among other data, a description of the gamut profile associated with the image. As described herein, this description may include a description of the color space the image is to be displayed on. This description may include an indication of industry-defined gamut profiles such as sRGB, ITU-R BT.709, Adobe RGB developed by Adobe Systems, Inc., DCI-P3, ITU-R BT.2020, among other gamut profiles defined or published by the International Telecommunication Union (ITU) or other organization. In an example, the description may include a description of the color space of an arbitrary gamut profile as described herein.

When the processor (205) has received this tag and its description of the gamut profile associated with an image to be presented on the display device (210), the processor (205) may send, at least, the description of the gamut profile associated with the image to be displayed on the display device (210). The display device (210) has a wide gamut (215) as described herein. The display device (210) may then determine if it can display the image using that gamut profile and display that image if it is capable of doing so. In this example, the display device (210) may switch from a first gamut profile such as sRGB to a relatively larger gamut profile such as ITU-R BT.2020. Although this is merely an example, the wide gamut (215) is meant to encompass a plurality of gamut profiles and switching from a first gamut profile to a second gamut profile may cause the display device (210) to show more or less of a color space than previously depending on which gamut profile the display device (210) was showing previously. Additionally, by sending information to the display device (210) describing the gamut profile of the image to be presented, a user will not have to adjust the gamut profile on the display device (210) manually. Instead, the most encompassing gamut profile is used and presented to the user thereby increasing usability of the display device (210).

In an example, the image to be provided to the display device (210) may include a first part and a second part: the first part being associated with a first gamut profile and the second part being associated with a second gamut profile. In this example, either the first or second gamut profile includes a color space larger than the other. Similar to above, this information may be passed to the display device (210) describing the metes and bounds of the different image parts and what gamut profiles are associated with those parts. In this example, the display device (210) being a wide-gamut display device (210) can adjust its gamut profile for a specific area on a screen of the display device (210) according to the first gamut profile associated with the first part of the image. Additionally, the display device (210) may adjust its gamut profile for a specific area on a screen of the display device (210) according to the second gamut profile associated with the second part of the image. In an example, this may be accomplished by implementing a hook to intercept operating system calls in order to modify the functionality of an executing application or other component that presents, to the display device (210), the two individual parts of the display device (210). In an example, an image source may indicate that, for example, the execution of a browser application is to be viewed in sRGB gamut profile while the execution of a video playing applet within a webpage being viewed should be represented in a relatively larger gamut profile such as DCI P3. In this way, the definition of what portions of the scree of the display device (210) that display in specified gamut profiles may be defined by what graphical portions of the applications are being presented on the display device (210). This may be done on an application-by-application basis using a windows manager. The windows manager may control the placement on the display device (210) of GUIs resulting from executing applications or image sources.

This allows two or more individual gamut profiles to be displayed simultaneously on the display device (210). Such situations may occur where a user accesses, for example, a website that hosts a number of video files. In this example, the website may be displayed in the sRGB gamut profile while a video player embedded in the website may display the video in a DCI-P3 gamut profile. After receiving the individual gamut profiles (first and second) associated with the website and video player, respectively, the display device (210) will continuously present their respective images until another or separate image is presented to the display device (210).

Figure 3:
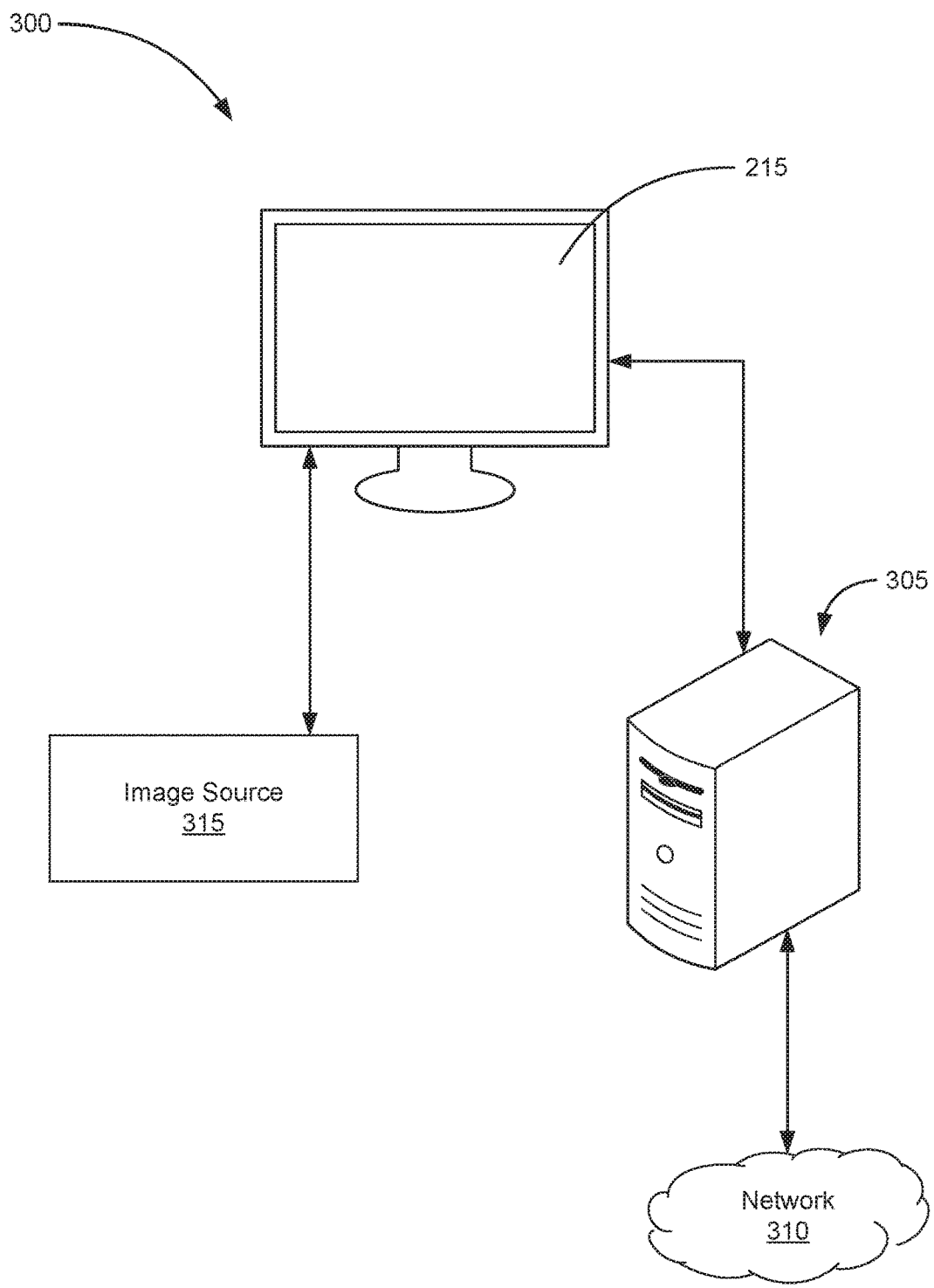
FIG. 3 is a diagram of a system for adjusting a gamut on a display device according to an example of the principles described herein.

FIG. 3 is a diagram of a system (300) for adjusting a gamut profile on a display device (210) according to an example of the principles described herein. The system (300) includes a display device (210) as described herein in connection with FIGS. 1 and 2. Additionally, the system (300) may include a computing device (305) communicatively coupled to a network (310) as well as other image sources (315). As described herein, the display device (210) has a wide-gamut display device (210) that allows for the display device (210) to adjust from one gamut profile to another based on receipt of an indication of a gamut profile associated with an image to be displayed. In an example, the display device (210) may provide to an image source (315) or a computing device a list of gamut profiles the display device (210) can accommodate. In an example, the display device (210) may provide to an image source (315) or a computing device data describing the total color space encompassing a plurality of gamut profiles that can be replicated on the display device (210).

The display device (210) receives image data from a number of sources including the computing device (305) and other image sources (315) such as a digital cable broadcast, a storage device such as a Secure Digital Card (SD card) developed by the SD Card Association (SDA). In the example where the image source (315) provides the image data to the display device (210), a tag associated with the image to be displayed may be provided to the display device (210). This tag indicates the gamut profile associated with the image. This gamut information is provided to the display device (210) using, for example, a display data channel (DDC) such as a DDC/CI or other physical or wireless connection that allows communication to and from the display device (210) to be accomplished.

In the example where the image source is a computing device (305) additional types of images may be provided. In an example, the computing device (305) may execute any number and type of executable applications including browser applications to access a network such as an intranet and the Internet, image and graphics editing applications, word processing applications, spreadsheet programs, e-mail programs, computer-aided design (CAD) applications, among others. Each of these types of executed applications may be executed by a processor (FIG. 2, 205) on the computing device (305). Additionally, each of these executable programs may have a specific gamut profile associated with a number of executable files associated with the applications.

As an example, a photo editing application may provide a graphical user interface to be presented in an sRGB gamut profile. However, during execution of the photo editing application, a file may be opened defining a digital photo. This digital photo may include a tag associated therewith that indicates that the photo is to be represented in a DCI-P3 gamut profile thereby increasing the color space of the image relative to the GUI of the executed application. A specific portion of the GUI of the photo editing application may be reserved for display of the relatively larger gamut photo to be edited. In this example, both the gamut profile associated with the GUI of the executed photo editing application and the gamut profile associated with the digital photo file is presented to the display device (210) by the processor (FIG. 2, 205) via a wired or wireless communication channel, Along with an indication of the two different gamut profiles being provided to the display device (210), the metes and bounds of the area on the display device (210) to be occupied by the GUI of the executing photo editing device and the area on the display device (210) to be occupied by the digital photo are provided. The two different gamut profiles may then be displayed simultaneously on the display device (210) with the display device (210) adjusting the gamut profile of those areas described above. In some examples, the gamut profile may be changed from a first gamut profile to a second gamut profile in order to match the gamut profile of any of the areas on the display device (210). In some examples, the gamut profile may not be changed because the gamut profile for a specific area on the display device (210) was already displaying that gamut profile for that area. In either example, a processor (FIG. 1, 105) of the display device (210) receives the gamut information or tag defining the gamut profile of the image or images to be displayed and determines what areas of the display device (210) are to display a specific gamut profile.

A similar example may occur where a user executes a browser program on the computing device (305) in order to access a website that, for example, hosts a number of still or video images. Again, each of the applications and files being executed by the processor (FIG. 2, 205) of the computing device may send an associated tag defining a gamut profile or the information related to the gamut profile to the display device (210) so that the gamut profile of the display device (210) or the gamut profile of areas of the display device (210) may be adjusted.

By adjusting the gamut profile of the display device (210) or the gamut profile of specific areas of the display device (210), the best quality of imaging may be presented to a user. Indeed, a user can view each application GUI and/or file in a color space that increases the color space presented beyond what may otherwise be achievable. Further, by using the wide-gamut display device (210), an image source (315) or computing device (305) will not engage in a gamut conversion process before sending the image to the display device (210). This reduces the time to display the image as well as reducing the processing resources used to display the image or images. Even further, a user is able to use the wide-gamut display device (210) without configuring the display device manually or having to determine which gamut profiles to set the wide-gamut display to in order to accurately view the image. Indeed, a user executing a number of applications in a variety of gamut profiles will be provided with a display device (210) that automatically manages the gamut profiles as the user accesses and causes to be executed the various applications and associated files so that the colors within the appropriate color space are presented accurately. Switching from one executed application or other image source allows the display device (210) to detect gamut profile changes based on the content to be displayed.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (105) of the visual output device (100) and/or the processor (205) of the computing device (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A visual output device comprising:
a processor to receive an indication of among a plurality of gamut profiles, a specific gamut profile of an image to be presented on the visual output device from a computing device, wherein the indication of the specific gamut profile is a tag associated with the file describing the image to be presented on the visual output device; and
wherein the processor dynamically adjusts a gamut profile of the visual output device to match the gamut profile of the image.

2. The visual output device of claim 1, wherein the visual output device receives the indication of the specific gamut profile from a processor of a computing device, the processor of the computing device determining a gamut profile represented in the tag associated with a file describing the image to be presented on the visual output device.

3. The virtual output device of claim 1, wherein the visual output device provides an indication to the computing device when the visual output device cannot match the gamut profile of the image.

4. The visual output device of claim 3, wherein the visual output device provides a list of gamut profiles the visual output device may accommodate and receives from the computing device a converted version of the gamut profile matching a gamut profile available to the visual output device when the visual output device has indicated that it cannot match the gamut profile of the image.

5. The visual output device of claim 1, wherein a viewable space on the visual output device presents at least two different regions using two different gamut profiles.

6. The visual output device of claim 5, wherein one of the at least two different gamut profiles is the gamut profile of the image.

7. A computing device, comprising:
a processor; and
a display device communicatively coupled to the processor;
wherein:
the display device comprises a wide gamut mode wherein the wide gamut mode comprises a plurality of different gamut profiles;
the display device adjusts from a first gamut profile to a second gamut profile to match a gamut profile associated with an image to be represented on the display device; and
the adjustment from the first gamut profile to the second gamut profile is based on a gamut profile of the image to be represented on the display device represented in a tag associated with the image.

8. The computer device of claim 7, wherein a viewable space on the display device presents at least two different regions using the first and second gamut profiles.

9. The computing device of claim 7, wherein the display device sends information to the processor indicating the plurality of different gamut profiles that can be represented in the wide gamut mode.

10. A computer program product for adjusting gamut profiles on a display device the computer program product comprising:
a computer readable storage medium comprising computer usable program code embodied therewith, the computer usable program code to, when executed by a processor:
receive, over a display data channel, an indication of a first gamut profile associated with an image to be presented on the display device, wherein the indication is received from a computing device and is a tag associated with the image; and
at the display device, switch from a second gamut profile to the first gamut profile.

11. The computer program product of claim 10, wherein an error message is sent to the computing device from the display device indicating the display device cannot present the image in the first gamut profile.

12. The computer program product of claim 10, further comprising presenting the image on the display device according to the first gamut profile while also presenting an image on the display device using the second gamut profile.

13. The visual output device of claim 1, wherein:
the image comprises a first part and a second part;
the first part is associated with a first gamut profile; and
the second part is associated with a second gamut profile.

14. The visual output device of claim 13, wherein a file describing the image identifies different image parts and what gamut profiles are associated with the different image parts.

15. The visual output device of claim 13, wherein the processor is to:
adjust a gamut profile for a first area of the visual output device associated with the first part of the image to the first gamut profile; and
adjust a gamut profile for a second area of the visual output device associated with the second part of the image to the second gamut profile.

16. The computer program product of claim 10, wherein only a specific region of the display device to display the image is switched to the second gamut profile.

17. The computer program product of claim 16, wherein the specific region of the display device switched to the second gamut profile is associated with an embedded video.

18. The visual output device of claim 1, wherein the processor is to adjust a gamut profile of just an area of the display device to display the image.

\* \* \* \* \*